Patented Nov. 16, 1926.

1,607,196

UNITED STATES PATENT OFFICE.

HANS HAHL AND WALTER KROPP, OF ELBERFELD, GERMANY, ASSIGNORS TO WINTHROP CHEMICAL COMPANY, INC., OF NEW YORK, N. Y.

VANADIUM COMPOUND.

No Drawing. Application filed September 25, 1925, Serial No. 58,652, and in Germany December 24, 1924.

We have found that new and therapeutically valuable vanadium compounds can be obtained by treating 8-hydroxyquinolines with vanadium oxides, e. g. the trioxide, tetroxide or pentoxide of vanadium.

The new products are generally colored powders almost insoluble in cold and hot water and almost insoluble in caustic soda lyes. They are decomposed by mineral acids. They have proved to be useful remedies for the treatment of spyrochaetoses, e. g. syphilis. They are used in emulsions with indifferent media, e. g. oil, liquid, paraffine, etc., e. g. for subcutaneous use.

In order to illustrate the new invention the following example is given, the parts being by weight:—

30 parts of 8-hydroxyquinoline and 10 parts of vanadium trioxide are heated together with 300 parts of water. After the reaction is complete the precipitate is filtered off, treated with dilute caustic soda lye, washed with water and dried. It is a brownish green powder almost insoluble in hot water and containing about 15% vanadium.

The compound most probably has the formula

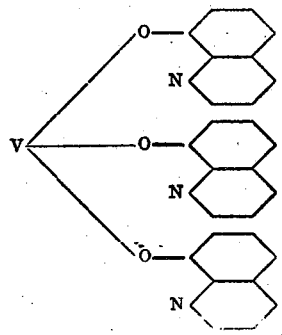

wherein V represents vanadium.

The product obtained from 8-hydroxyquinoline-5-sulfonic acid and vanadium tetroxide is a greenish-grey powder containing 12–13% of vanadium and that obtained from 5-methyl-8-hydroxyquinoline is a greygreen insoluble powder.

We claim:

1. The process for producing vanadium compounds of 8-hydroxyquinolines comprising the treatment of 8-hydroxyquinolines with vanadium oxides and isolating the resulting products, substantially as described.

2. The herein-described new vanadium compounds of hydroxyquinoline, which are generally greenish colored products scarcely soluble in water and in alkalies and being useful remedies against spyrochaetoses, substantially as described.

3. The herein-described new vanadium compound obtainable from 8-hydroxyquinoline and vanadium trioxide being a brownish-green powder scarcely soluble in hot water, containing about 15% of vanadium and being a useful remedy against spyrochaetoses, substantially as described.

In testimony whereof we have hereunto set our hands.

HANS HAHL.
WALTER KROPP.